United States Patent
Sheriff et al.

(10) Patent No.: US 11,979,862 B2
(45) Date of Patent: *May 7, 2024

(54) TIME-SENSITIVE NETWORKING IN HIGH DENSITY NETWORKS

(71) Applicant: Cisco Technology, Inc., San Jose, CA (US)

(72) Inventors: Akram I. Sheriff, San Jose, CA (US); Pascal Thubert, Roquefort les Pins (FR); Jerome Henry, Pittsboro, NC (US); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/929,294

(22) Filed: Sep. 1, 2022

(65) Prior Publication Data

US 2022/0417925 A1 Dec. 29, 2022

Related U.S. Application Data

(63) Continuation of application No. 16/868,312, filed on May 6, 2020, now Pat. No. 11,445,500.

(51) Int. Cl.
| | |
|---|---|
| *H04W 72/0446* | (2023.01) |
| *H04L 1/00* | (2006.01) |
| *H04L 12/18* | (2006.01) |
| *H04W 52/34* | (2009.01) |
| *H04W 88/08* | (2009.01) |
| *H04W 92/20* | (2009.01) |

(52) U.S. Cl.
CPC ....... *H04W 72/0446* (2013.01); *H04L 1/0003* (2013.01); *H04L 12/189* (2013.01); *H04W 52/34* (2013.01); *H04W 88/08* (2013.01); *H04W 92/20* (2013.01)

(58) Field of Classification Search
CPC . H04W 72/0446; H04W 52/34; H04W 92/20; H04W 88/08; H04L 12/189; H04L 1/0003
See application file for complete search history.

(56) References Cited

U.S. PATENT DOCUMENTS

| 11,445,500 B2 * | 9/2022 | Sheriff | ........... H04W 52/34 |
| 2007/0297363 A1 * | 12/2007 | Jalil | ........... H04W 52/367 370/344 |
| 2010/0020760 A1 * | 1/2010 | Grandblaise | ........... H04L 5/023 370/330 |
| 2011/0249644 A1 * | 10/2011 | Boariu | ........... H04W 72/23 455/450 |

(Continued)

*Primary Examiner* — Christine Ng
(74) *Attorney, Agent, or Firm* — Patterson + Sheridan, LLP (57) ABSTRACT

Providing for time sensitive networking (TSN) traffic in high density deployments is described. An access point (AP) is a high density deployment receives a message identifying another AP as a TSN neighbor and also detects a TSN device within an area covered by the APs. This arrangement may cause traffic interruptions for the TSN traffic between the TSN device and the APs. In order to prevent disruption in TSN traffic, a TSN time slot and a resource unit (RU) is determined for each of the APs, and the TSN traffic is communicated between the various devices in network according to the determined TSN time slot and RU.

20 Claims, 5 Drawing Sheets

(56) References Cited

U.S. PATENT DOCUMENTS

| | | | | |
|---|---|---|---|---|
| 2012/0220324 A1* | 8/2012 | Sambhwani | ........ | H04W 52/243 |
| | | | | 455/501 |
| 2012/0314587 A1* | 12/2012 | Curticapean | .......... | G01S 5/0284 |
| | | | | 370/252 |
| 2014/0078960 A1* | 3/2014 | Nakata | ................ | H04W 56/001 |
| | | | | 370/328 |
| 2014/0205038 A1* | 7/2014 | Nakamura | .......... | H04L 25/0391 |
| | | | | 375/267 |
| 2015/0078353 A1* | 3/2015 | Zhang | ................... | H04W 16/14 |
| | | | | 370/336 |
| 2016/0373985 A1* | 12/2016 | Bengtsson | ............ | H04B 7/0413 |
| 2017/0070390 A1* | 3/2017 | Poola | .................... | H04W 8/005 |
| 2018/0132234 A1* | 5/2018 | Cavalcanti | ............ | H04W 72/02 |
| 2019/0357231 A1* | 11/2019 | Gupta | ................... | H04L 1/1896 |
| 2020/0304173 A1* | 9/2020 | Chu | .................. | H04W 72/0453 |
| 2021/0219253 A1* | 7/2021 | Van Phan | ........... | H04L 41/0893 |

* cited by examiner

TIME-SENSITIVE NETWORKING IN HIGH DENSITY NETWORKS

CROSS-REFERENCE TO RELATED APPLICATIONS

This application is a continuation of co-pending U.S. patent application Ser. No. 16/868,312 filed May 6, 2020. The aforementioned related patent application is herein incorporated by reference in its entirety.

TECHNICAL FIELD

Embodiments presented in this disclosure generally relate to deterministic communication in high density networks. More specifically, embodiments disclosed herein relate to guaranteeing time-sensitive networking from access points in high density deployments.

BACKGROUND

Wi-Fi 6 refers to the Institute of Electrical and Electronics Engineers (IEEE) specification 802.11ax, which is a developing wireless local area network (WLAN) specification in the IEEE 802.11 set of specifications. Wi-Fi 6 improves overall spectral efficiency, especially in high density deployment scenarios, which are becoming more and more common in WLAN deployments with the advent and implementation of Wi-Fi 6 in networks.

In high density Wi-Fi 6 network systems, interference between various overlapping network devices is common and may be difficult to control, even when utilizing a centrally controlled wireless network using basic service sets (BSS) or extended service set (ESS) deployments. In high density deployments, a time-sensitive networking (TSN) device operating between two Wi-Fi 6 access points operating on the same channel, is subject to a high collision probability for any TSN traffic sent by the Wi-Fi 6 APs. These high collision probability conditions reduce the ability to guarantee deterministic traffic between various devices in the network required by TSN.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method also includes receiving, at a first access point (AP), a time sensitive networking (TSN) neighbor message identifying a second AP as a TSN neighbor, detecting a TSN device within an area covered by the first AP and the second AP, where the TSN device is physically located between the first AP and the second AP, and upon detecting the TSN device is within the area, determining, via communication between the first AP and the second AP, a TSN time slot for the first AP. The method also includes determining, via communication between the first AP and the second AP, a resource unit (RU) for the first AP to transmit TSN traffic and transmitting TSN traffic to the TSN device according to the TSN time slot for the first AP and the RU for the first AP. Other embodiments of this aspect include corresponding computer systems, apparatus, and computer programs recorded on one or more computer storage devices, each configured to perform the actions of the methods.

One example embodiment includes a system with one or more computer processors. The system also includes a memory containing a program which when executed by the computer processors performs an operation. The operation includes: receiving, at a first access point (AP), a time sensitive networking (TSN) neighbor message identifying a second AP as a TSN neighbor, detecting a TSN device within an area covered by the first AP and the second AP, where the TSN device is physically located between the first AP and the second AP, and upon detecting the TSN device is within the area, determining, via communication between the first AP and the second AP, a TSN time slot for the first AP. The operation also includes determining, via communication between the first AP and the second AP, a resource unit (RU) for the first AP to transmit TSN traffic and transmitting TSN traffic to the TSN device according to the TSN time slot for the first AP and the RU for the first AP.

One example embodiment includes a computer program product a computer-readable storage medium having computer-readable program code embodied therewith, the computer-readable program code executable by one or more computer processors to perform an operation. The operation may include: receiving, at a first access point (AP), a time sensitive networking (TSN) neighbor message identifying a second AP as a TSN neighbor, detecting a TSN device within an area covered by the first AP and the second AP, where the TSN device is physically located between the first AP and the second AP, and upon detecting the TSN device is within the area, determining, via communication between the first AP and the second AP, a TSN time slot for the first AP. The operation may also include: determining, via communication between the first AP and the second AP, a resource unit (RU) for the first AP to transmit TSN traffic and transmitting TSN traffic to the TSN device according to the TSN time slot for the first AP and the RU for the first AP.

Example Embodiments

In high density advanced Wi-Fi network systems, the large number of network devices operating in close physical proximity frequently causes interference between the devices. These interferences can cause network connection problems such as dropped network traffic or slowed connections. In some deployments, these network connection problems can be mitigated with various mechanisms such that the network continues to function even with some connectivity problems. However, for deterministic networking, the network connection problems in high density deployments can prevent deterministic guarantees of delivering network traffic.

For example, in high density deployments, a time-sensitive networking (TSN) device operating between two access points may be subject to network traffic interference such as high collision probability for any TSN traffic sent by the APs. The high collision probability reduces or prevents the network devices from guaranteeing deterministic traffic behavior between various devices in the network required by TSN.

The system and methods described herein provide for deterministic TSN traffic in high density deployments by negotiating and/or assigning time slots and resource units (RUs) for transmitting TSN traffic for various APs in wireless network deployments.

Figure 1:
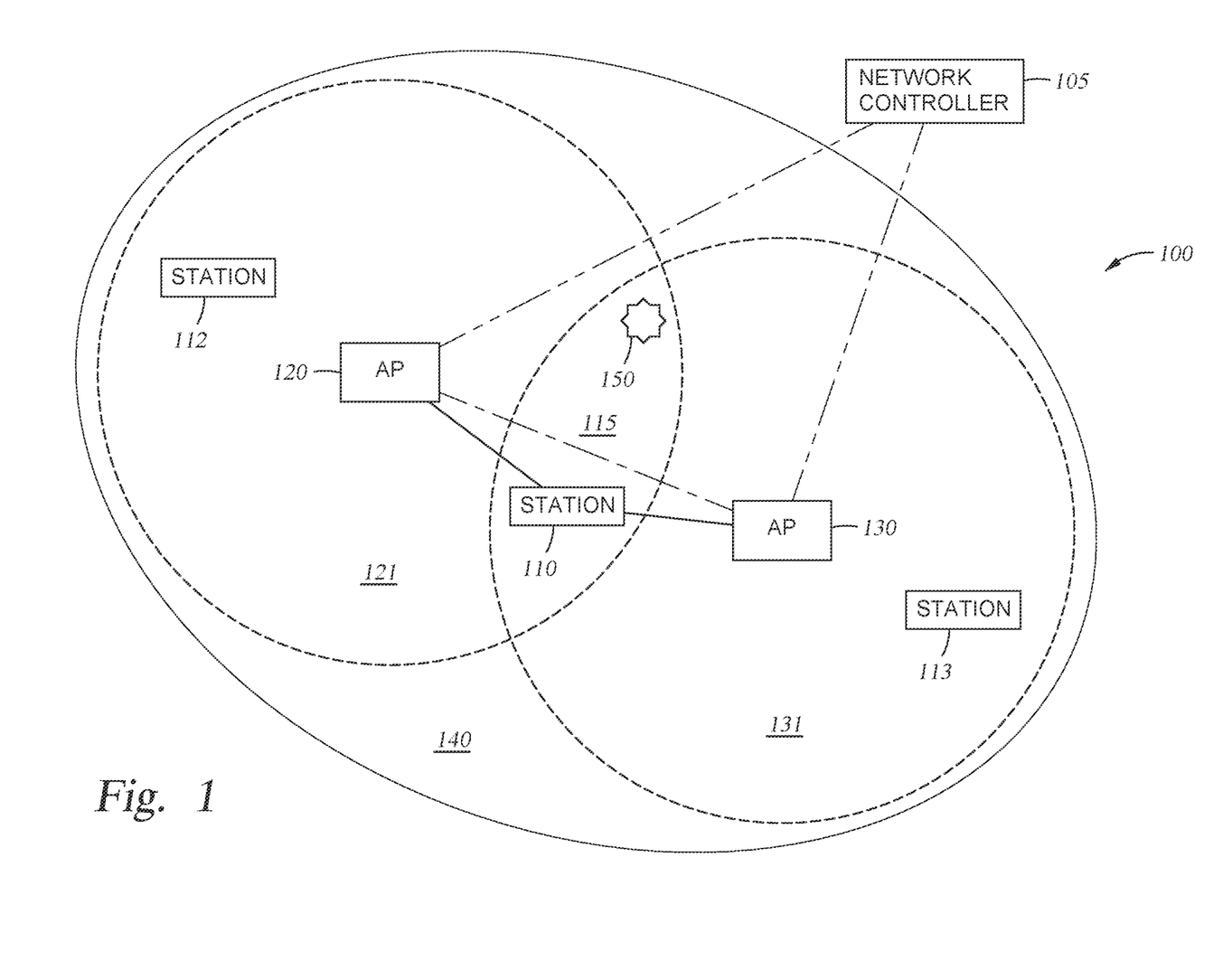
FIG. 1 illustrates a network, according to one embodiment described herein.

FIG. 1 illustrates a network 100, according to one embodiment described herein. The network 100 includes a high density deployment of APs under management by a network controller 105. The network controller 105 controls or manages a plurality of APs including APs 120 and 130 (among other APs not shown in FIG. 1). While the various embodiments described herein are described in relation to two APs (e.g., APs 120 and 130) the methods and functions may also apply to three or more APs providing TSN. The network controller 105 provides control and network access to the APs 120 and 130. The network access may include both internal networks (e.g., an intranet) and external networks (e.g., the Internet, wide area networks, etc.). The APs in turn provide network access to a device such as a station 110. The station 110 may include any TSN compatible programmable logic controller (PLC) station which has a WIFI interface (NIC). In some examples, the network controller 105, and the APs 120 and 130 also provide control messaging to the station 110 in addition to network access.

The high density deployment of the APs in the network 100 results in overlapping coverage areas of BSS's associated with the APs. For example, portions of BSS 121 associated with the AP 120 overlap a BSS 131 associated with the AP 130. This condition results in an overlapping BSS (OBSS), such as OBSS 115, which can cause network performance issues for the station 110 and the APs 120 and 130 without proper mechanisms at the APs to counteract the OBSS. The network performance issues may include a reduced ability to guarantee TSN between devices in the network.

In some examples, the two neighboring APs, APs 120 and 130 mutually detect that they are members of a same extended service set (ESS), such as ESS 140. For example the APs 120 and 130 may detect that the respective APs are both in the ESS 140 using neighbor discovery protocol (NDP) messaging through direct messaging between the APs 120 and 130 and/or NDP messaging via the network controller 105 (e.g., using a wireless local area network controller hash, etc.). In another example, the network controller 105 detects through NDP messaging that the APs 120 and 130 are in the ESS 140 and are neighboring APs.

In some example networks, the controller 105 instructs the neighboring APs (e.g., the APs 120 and 130) to operate on different channels (e.g. radio resource management (RRM)). However, in high density environments, such as the network 100, failure to achieve such separation results in both APs being placed on the same channel creating an OBSS scenario. As described herein, upon detection of the neighboring APs at the controller 105, the controller 105 provides a message or indication to the neighboring APs (e.g., the APs 120 and 130) that the APs are neighbors. In an example where both APs 120 and 130 provide TSN, the controller 105 also indicates that the APs 120 and 130 are TSN neighbors.

In some examples, the APs 120 and 130 use direct communication between the APs, such as Inter-Access Point Protocol (IAPP) messaging, to identify each other as neighbors. The direct communication between the APs may also detect that TSN networking is enabled on the respective neighboring AP(s). For example, the AP 120 detects, using IAPP, that the AP 130 is a (1) neighbor AP and that (2) the AP 130 is capable of TSN or communicating in TSN. When the neighboring APs are TSN neighbors, OBSS conditions may cause a loss of guaranteed TSN traffic for stations that are between the neighboring APs.

For example, the station 110 is physically located between the APs 120 and 130 and may experience loss of TSN networking due to OBSS conditions. As described herein, the AP 120 and the AP 130 may detect the physical location of the station 110 by using transmit power (Tx) beamforming processes, using the Channel state information (CSI) Matrix, and/or using equivalent isotropically radiated power (EIRP) information between AP 120, station 110, and AP 130. In some examples, the presence of the station 110 in the OBSS 115 may cause traffic interference and other congestion conditions such that TSN is not possible or guaranteed since network traffic may not be uploaded or downloaded to the station 110 in a reliable or deterministic manner without implementing a mechanism to provide for TSN traffic.

As described herein, once the physical location of the station 110 is identified as physically between the AP 120 and the AP 130, the neighboring AP pair (including the AP 120 and 130 and other APs not shown if present) negotiate TSN Time Slots and a resource unit (RU) in which TSN traffic will be sent in the network such that TSN traffic to and from the station 110 can be guaranteed. In some examples, a Wi-Fi 6 AP functions as a TSN listener and replicates any TSN packets received at the AP with DCM Dual carrier modulation (DCM). Furthermore, as described herein the packet replication and sequencing is done to send those TSN packets in a same OFDMA burst but at different points in time and different RUs, which guarantees spatial and temporal diversity for TSN Packet Traffic.

In another example, the AP 120 may estimate an interference by the other AP, the AP 130, based on relative angles of the neighboring APs. For example, when the AP 120 is in communication to a TSN node such as the station 120, and the AP 130 with an angle that is more than 90° from each other, the AP 130 may still emit at an angle that is also more than 90% (using multi-user, multiple input, multiple output processes) from the AP 120 and not interfere in the TSN traffic between the AP 120 and the station 110. In this example, the AP 130 does not transmit to the station 120 at all and selects stations that are at an angle that opposite or nearly opposite the AP 120-station 110 direction, and arrange the communications that are going in the same direction. For example, when a physical alignment is station 112—AP 120—AP 130-station 113, the station 112 communicates to AP 120 at a same time AP 130 communicates to station 113, and station 113 communicates to AP 130 when AP 120 communicates to station 112. This maximizes the distance between the interferer and the receiver. The direction of the station attached to the other AP (AP 130) may be estimated since the AP 120 and AP 130 know the direction to one another, and can exchange angles relative to that physical alignment.

In some examples, in order to provide TSN the APs 120 and 130 do not utilize the same time slot and RU, thus protecting TSN traffic transmission in the network 100. The APs 120 and 130 may also avoid using a RU that is used by a device that is not under control of the network controller 105, such as rogue device 150. In some examples, RU starvation by rogues may include any other Non-TSN PLC 802.11ax compatible client/station which might be utilizing a particular RU allocation over a longer period of time. For example, a station/client sending or downloading some video traffic may be classified a rogue if that is using an RU meant to be allocated to a TSN PLC Station.

In some examples, when the APs 120 and 130 are negotiating an RU to utilize, both APs will avoid the RU used by the rogue device 150. When the time slots and RUs are negotiated or assigned to the respective APs TSN traffic transmission is possible.

Figure 2:
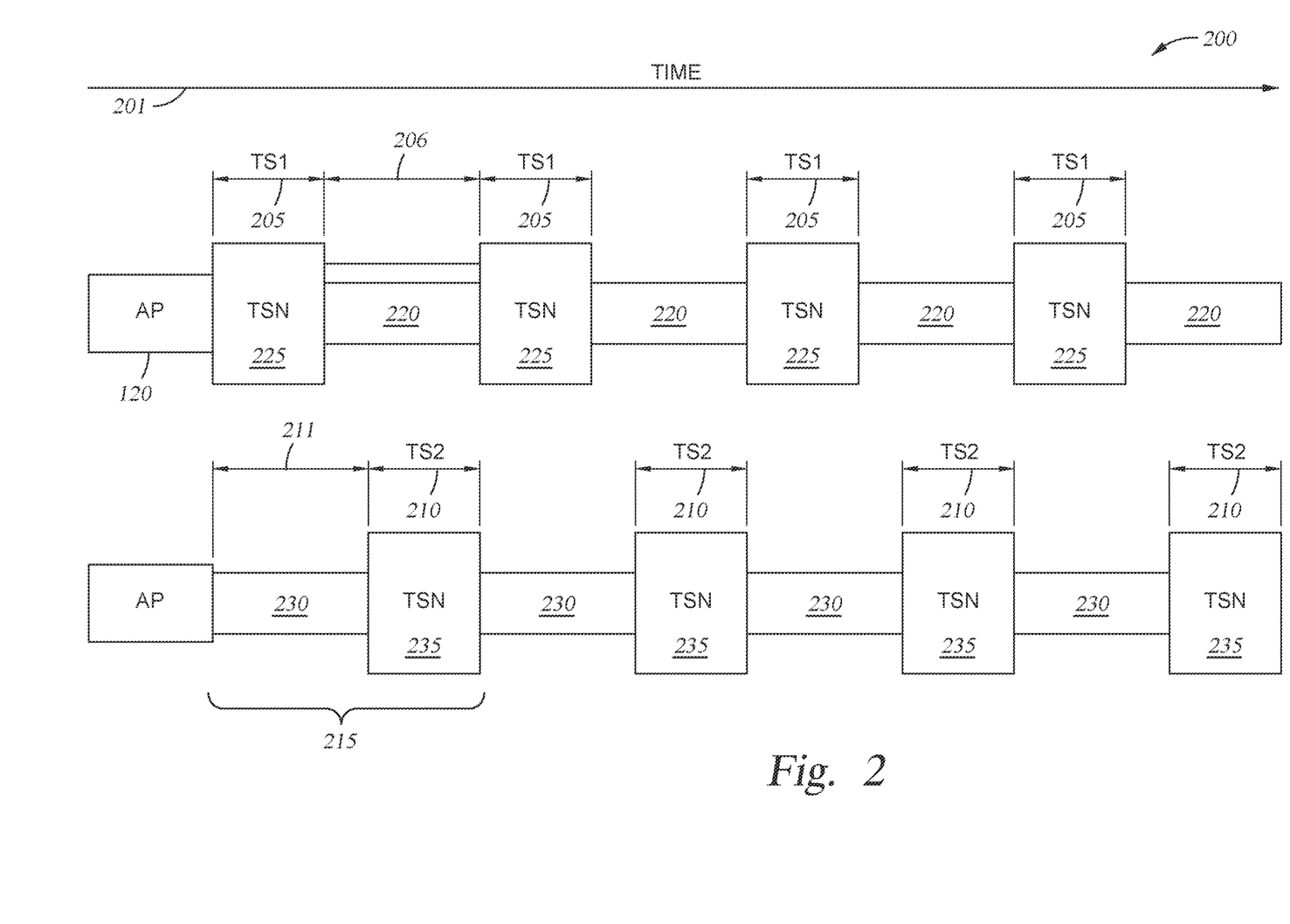
FIG. 2 illustrates time-sensitive networking transmissions, according to one embodiment described herein.

For example as shown in FIG. 2, which illustrates time-sensitive networking transmissions 200, upon negotiating the TSN time slots and RU for each AP, the APs 120 and 130 transmit network traffic according to the scheme shown in FIG. 2. As time 201 proceeds through a time window 215, AP 120 transmits TSN traffic 225 during a first time slot (TS1) 205 within the time window 215 and non-TSN traffic 220 during time 206 within the time window 215.

Also as time 201 proceeds through the time window 215, AP 130 transmits non-TSN traffic 230 during time 211 within the time window 215, of which at least a portion of the time 211 overlaps with the TS1 205 and transmits TSN traffic 235 during a second TSN time slot (TS2) 210 within the time window 215. In some examples, the AP 120 transmits the TSN traffic 225 in a first RU and the AP 130 transmits the TSN traffic 235 in a second RU different from the first RU. As time 201 proceeds, the time window 215 repeats such that the TSN traffic 225 from the AP 120 and the TSN traffic 235 from the AP 130 are not transmitting during a same time slot. The negotiation of TS1 and TS2 as well as the first and second RUs is described in more detail in relation to FIGS. 3-5.

Figure 3:
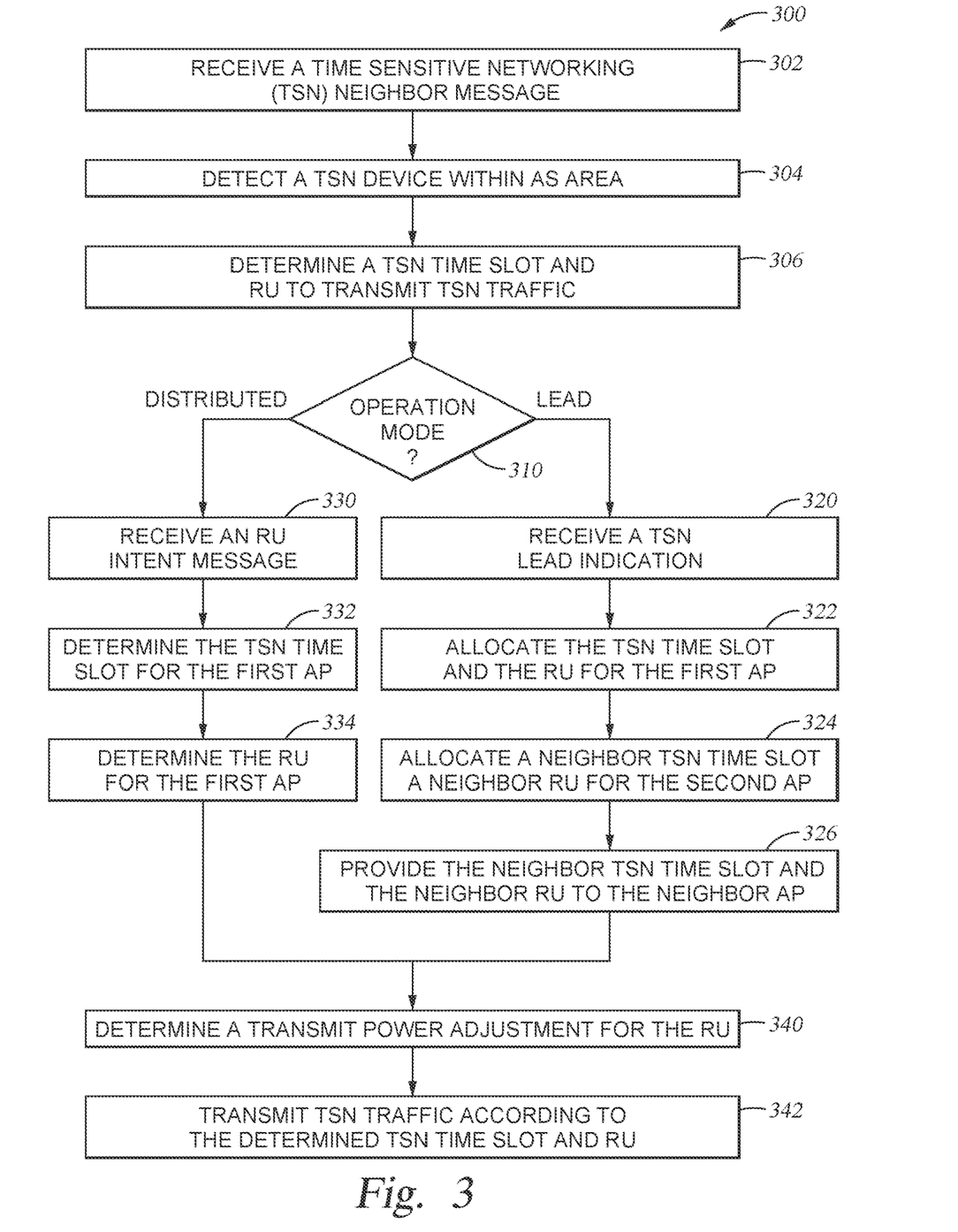
FIG. 3 is a method for time-sensitive networking in a network, according to one embodiment described herein.

FIG. 3 is a method 300 for time-sensitive networking in a network, according to one embodiment described herein. For the purposes of discussion, the method 300 is described as being performed by the AP 120. In some examples, the AP 120 is embodied as the AP 600 described in relation to FIG. 6, which includes the TSN module 611 and the assignment module 612 which may perform the various operations described herein. Method 300 begins at block 302 where the AP 120 receives a TSN neighbor message. In some examples, the TSN neighbor message identifies a second AP, such as the AP 130 as a TSN neighbor using direct inter-AP communication, such as IAPP. In a direction communication example, the TSN neighbor message is a return message from the AP 130 which identifies the AP 130 as a neighboring AP and/or a neighboring TSN AP.

In some examples, the controller 105 determines that the AP 120 and AP 130 are neighbors using various discovery and communication mechanisms with the APs 120 and 130. Upon determining the APs 120 and 130 are TSN neighbors, the controller 105 sends a TSN neighbor message to the APs 120 and 130 using control messaging to alert the APs of the respective TSN neighbors. Upon receipt of the TSN neighbor message indicating the AP 130 is a TSN neighbor, the AP 120 begins a process to discover whether a TSN capable device is located between the APs 120 and 130.

At block 304, the AP 120 detects a TSN device TSN device within an area covered by the first AP (AP 120) and the second AP (AP 130), where the TSN device is physically located between the first AP and the second AP. For example, as shown in FIG. 1, the station 110 is located in the OBSS 115 and physically between the AP 120 and the AP 130. The AP 120 may detect the location of the station 110 using a variety of techniques including detect the physical location of the station 110 by using Tx beamforming processes, using information in the CSI Matrix, or using EIRP information received and stored on the AP 120. In some examples, the second AP (AP 130) may detect the location of the station 110 and report the location to the AP 120 using either direct messaging to the AP 120 or messaging via the controller 105.

In another example, when the AP 120 is in communication to a TSN node such as the station 110, and the AP 130 with an angle that is more than 90° from each other, the AP 130 may still emit at an angle that is also more than 90% (using multi-user, multiple input, multiple output processes) from the AP 120 and not interfere in the TSN traffic between the AP 120 and the station 110. In this example, the AP 130 does not transmit to the station 110 at all and selects stations that are at an angle that opposite or nearly opposite the AP 120—station 110 direction, and arranges the communications that are going in the same direction station 112—AP 120—AP 130-station 113, the station 112 communicates to AP 120 at a same time AP 130 communicates to station 113, and station 113 communicates to AP 130 when AP 120 communicates to station 112. This maximizes the distance between the interferer and the receiver. The direction of the STA attached to the other AP (AP 130) may be estimated since the AP 120 and AP 130 know the direction to one another, and can exchange angles relative to that physical alignment.

At block 306 the AP 120 determines via communication between the first AP and the second AP, a TSN time slot for the first AP and determines, via communication between the first AP and the second AP, a resource unit (RU) for the first AP to transmit TSN traffic. For example, the first AP determines a TSN time slot for itself and the neighboring TSN AP, (e.g., the AP 130). The determination of the TSN time slots and RUs is dependent on the operation mode determined in block 310 and whether the AP 120 is a TSN lead or the operation mode is distributed. In either case, the determination of the TSN time slots and RUs is done at the AP level in order to prevent system level latency that would be introduced by using the controller 105 to determine TSN time slots and RUs.

At block 310, the AP 120 determines an operation mode for the AP 120. In an example where the network, such as the network 100 is operating in a lead mode, the method 300 proceeds to block 320 where the AP 120 receives a TSN lead indication, indicating the AP 120 is the TSN lead. In some examples, the AP 120 is designated as the TSN lead for the AP pair (e.g., the APs 120 and 130) by the controller 105. The controller 105 may choose a TSN lead upon detection of TSN neighbors and/or upon a request for a TSN lead from TSN neighbors. For example, the APs 120 and 130 may determine they are TSN neighbors via direct messaging but request that a TSN lead be designated by the controller 105. In another example, the TSN neighbors may request a TSN lead from the controller upon detection of a TSN device within an area covered by both TSN neighbors as described in relation to block 304.

In another example, the TSN neighbors negotiate/designate the TSN lead via direct messaging. For example, the APs 120 and 130 mutually designate the AP 120 as the TSN lead. Whether the TSN lead is designated by the neighboring APs or by the controller 105, the non-TSN lead AP(s) wait for the TSN lead to allocate/assign the various TSN time slots and RUs before transmitting TSN traffic.

In the example where the AP 120 is designated as the TSN lead as indicated in the received TSN lead indication, the method 300 continues to block 322 where the AP 120 allocates a TSN time slot and a RU for the first AP (e.g., the AP 120). At block 324, the AP 120 allocates a neighbor TSN time slot for the second AP and a neighbor RU for the second AP.

In some examples, the TSN lead, AP 120, allocates the TSN time slot and RU and the neighbor TSN time slot and RU in order to ensure, with reference back to FIG. 2, that during the time window 215, the AP 120 transmits TSN traffic 225 during the TS1 205 and non-TSN traffic 220 during time 206. The allocation also ensures that the AP 130 transmits non-TSN traffic 230 during time 211 of which at least a portion of the time 211 overlaps with the TS1 205 and transmits TSN traffic 235 during the TS2 210. In some examples, the allocation of the TSN time slot and RU and the neighbor TSN time slot and RU is accomplished using various information received from the neighbor AP, (e.g., AP 130) and the controller 105 to avoid overlapping transmission times and overlapping RUs including rogue RUs from rogue devices such as the rogue device 150. When the AP 120 has allocated the TSN time slot and RU for itself and any neighboring APs, the AP allocations are provided to the neighboring APs.

At block 326, the TSN lead, AP 120, provides the neighbor TSN time slot and the neighbor RU to the second AP, the AP 130, such that the AP 120 and AP 130 transmit TSN according to the allocated time slots by the TSN lead. The AP 120 may also provide a starting time or various other synchronized clock information to ensure that the AP 120 and the AP 130 are transmitting using the same information.

Returning back to block 310, in an example where the network, such as the network 100 is operating in a distributed mode, the method 300 proceeds to block 330 where the AP 120 receives a RU intent message from the second AP, the AP 130. In some examples, the reception of the RU intent message indicates that the network 100 is operating in the distributed mode. In another example, the AP 120 may verify with the controller 105 and/or the AP 130 that the network 100 is operating in the distributed mode where the APs negotiate time slots and RUs. In some examples, the RU intent message includes a validity window indicating a time slot when the second AP, the AP 130, will or will not transmit TSN traffic. In some examples, the RU intent message also includes a RU utilized by the second AP, the AP 130.

In some examples, the RU intent message is an information element (IE) added to a NDP message (and/or an IE in beacons or specific OBSS action frames between APs, etc.).

In some examples, an AP receiving a RU intent from a validated TSN neighbor is required to avoid RU starvation by rogue devices and should not attempt to reserve that RU as indicated in the RU intent message.

The reception of the RU intent message may also serve as a trigger for the commencement of TSN traffic transmission. For example, upon receipt, the RU intent message may include an indication that a neighbor AP will begin transmitting TSN traffic as a specific time in addition to the validity window.

At block 332, the AP 120 determines the TSN time slot for the first AP based on the validity window. In an example, where the RU intent message serves as a trigger from the AP 130, the AP 120 determines a validity window that does not interfere with the validity window received from the AP 130 and assigns the determined validity window to the AP 120.

At block 334, the AP 120 determines the RU for the first AP based on the RU intent message. In an example, where the RU intent message serves as a trigger from the AP 130, the AP 120 determines a RU that does not interfere with the RU received from the AP 130 and assigns the determined RU to the AP 120. In an example where the AP 120 is utilizing a validity window that overlaps or conflicts with the validity window and/or RU received from the AP 130, the AP 120 and AP 130 further communicate via IAPP to determine adjustments to the validity window and/or RU used by each AP to avoid conflicts. For example, if an RU or validity window received in the RU intent message conflicts with the AP 120's own RU and transmission settings and/or a rogue devices RU, etc., the AP 120 will communicate that the RU intent message is rejected and negotiate a valid RU and transmission scheme with the neighboring APs (e.g., AP 130).

In some examples, the AP 120 in response to receiving the RU intent message at block 330 transmits an acknowledge message to the AP 130 and transmits TSN traffic according to the validity window received from the AP 130. In some examples, as the network 100 continues to transmit TSN traffic, the AP 120 and AP 130 communicate via RU intent messages in order to synchronize the various validity windows and utilized RUs in order to approach a transmission scheme as described in FIG. 2.

In either case, when the operation mode has been determined and the TSN time slot and RU for the AP 120 are determined, the method 300 proceeds to block 340 where the AP 120 determines a transmit power adjustment for the RU for the first AP. For example, the transmit power may adjusted per RU in either UL or DL to improve SINR. In another example, after the negotiation and/or the assignment of the RUs for AP 120 and 130, the APs 120 and 130 provide relative power boosting of their assigned RU when handling the TSN traffic in real time for the short duration of the assigned time slot. For example, when the AP 120 informs AP 130 not to use a particular RU for sending TSN Traffic, the RU is power boosted by the AP 120 and power may be reduced by the AP 130 for the same RU. In some examples, this relative power boosting provides better downlink efficiency for the station 110 and allows for deterministic performance for handling TSN traffic at the station 110.

At block 342, the AP 120 transmits TSN traffic according to the determined TSN time slot and RU. For example, the AP 120 transmits TSN traffic during TS1 05 at the determined RU as described above. In some examples, the AP 120 also adjusts the transmit power for the RU according to the determined boosted power during the TSN time slot determined at block 342.

Figure 4:
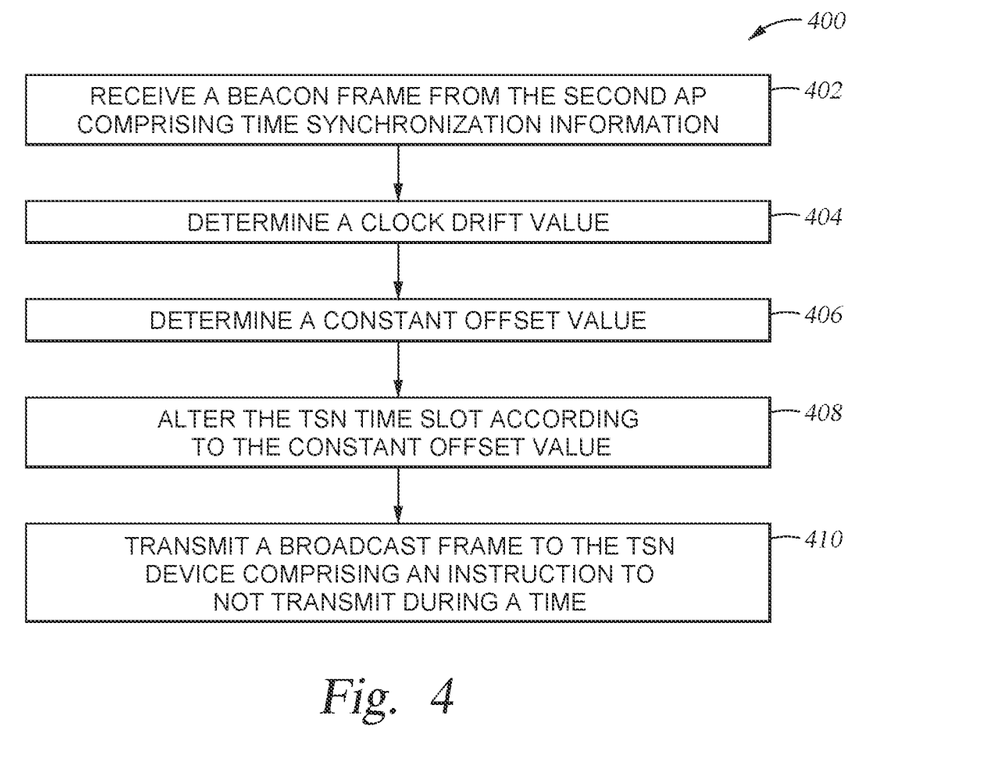
FIG. 4 is a method for time-sensitive networking time slot determination, according to one embodiment described herein.

FIG. 4 is a method for time-sensitive networking time slot determination, according to one embodiment described herein. Method 400 begins at block 402 where the first AP receives, at a first time, a beacon frame from the second AP, such as the AP 130, comprising time synchronization information. In some examples, the beacon frame is received as part of the RU intent message described in block 330. In another example, the beacon frame is received at a time after the RU intent message. The beacon frame may also be requested by the AP 120 when the AP 120 is the lead AP.

At block 404, the AP 120 determines, using the first time and the time synchronization information, a clock drift value between the first AP and the second AP. For example, the AP 120 uses the information received in the beacon frame to determine a clock drift value between the AP 120 and the AP 130. In some examples, Wi-Fi 6 AP clocks are more accurate than previous 802.11 clocks and are configured to measure each other's drift. For example, each TSN neighbor listens to the other AP's beacon, and reads a partial time synchronization function (TSF) time. The AP uses the timestamp at which the timer is read and evaluates relative clock drift to the neighbor AP. As each TU is a large duration, the neighboring APs may also use short beacons for communication with adaptively shorter intervals as larger drifts are measured with the goal of maintaining the clock drift value below a target value for the network. In some examples, determining the TSN time slot for the first AP as described in relation to block 332 also includes determining the TSN time slot for the first AP based on the validity window and the determined clock drift value.

At block 406, the AP 120 determines a constant offset value which may include enough offset for the time slots for each AP to not overlap. For example, in order to guarantee that the TSN traffic is transmitted in the determined time slots, the APs 120 and 130 may determine the constant offset value to account for any transmission lag or delay between the APs. At block 408 the AP 120 alters the TSN time slot for the first AP according to the constant offset value and transmits a broadcast frame to the TSN device, e.g., the station 110, comprising an instruction to not transmit during a time according to the clock drift value and the constant offset value at block 410. In some examples, the TSN device, e.g., the station 110, does not transmit during a specific time to prevent overlap.

For example, the neighbor or second AP will refrain from sending during that specific time window and augment its Network Allocation Vector (NAV) at the beginning of the window with NAV+clock drift+constant offset value. In some examples and contrary to long term evolution (LTE) networks, Wi-Fi 6 networks manage Carrier-sense multiple access (CSMA) co-existence. As such, in a hybrid network (Wi-Fi 6 and legacy stations present), the AP also sends a broadcast frame to its STAs, which duration is set to NAV+clock drift value+constant offset, thus temporarily preventing CSMA stations from taking the medium.

Figure 5:
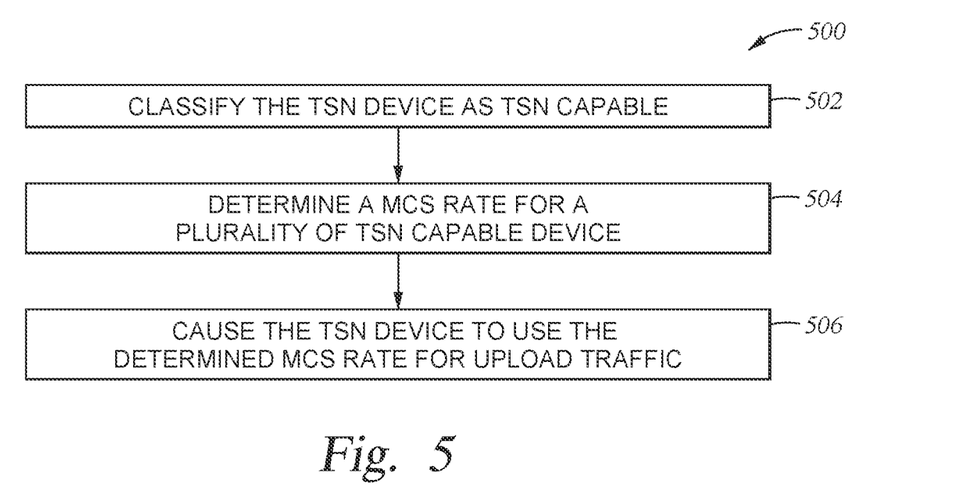
FIG. 5 is a method for synchronizing time-sensitive networking devices in a network, according to one embodiment described herein.

FIG. 5 is a method for synchronizing time-sensitive networking devices in a network, according to one embodiment described herein. Method 500 begins at block 502 where the AP 120 classifies the TSN device as TSN capable. For example, when the station 110 transmits uplink (UL) traffic to the AP 120, the AP 120 may determine the traffic is TSN traffic. In some examples, the AP 120 detects and classifies a plurality of TSN capable devices located in the network.

At block 504, the AP 120 determines a modulation and Coding Scheme (MCS) rate for a plurality of TSN capable devices connected to the first AP, the AP 120 and at block 506, the AP 120 causes the TSN device, such at the station 110, to use the determined MCS rate for upload traffic to the first AP. In some examples, the AP 120, based on UL RU Utilization of TSN devices associated to an 802.11ax AP, such as the AP 120, the AP 120 causes the TSN devices which have similar Path Loss Model to utilize the same MCS rate. This allows for more efficient TSN traffic transmission in the network between the neighboring APs and the TSN devices.

Figure 6:
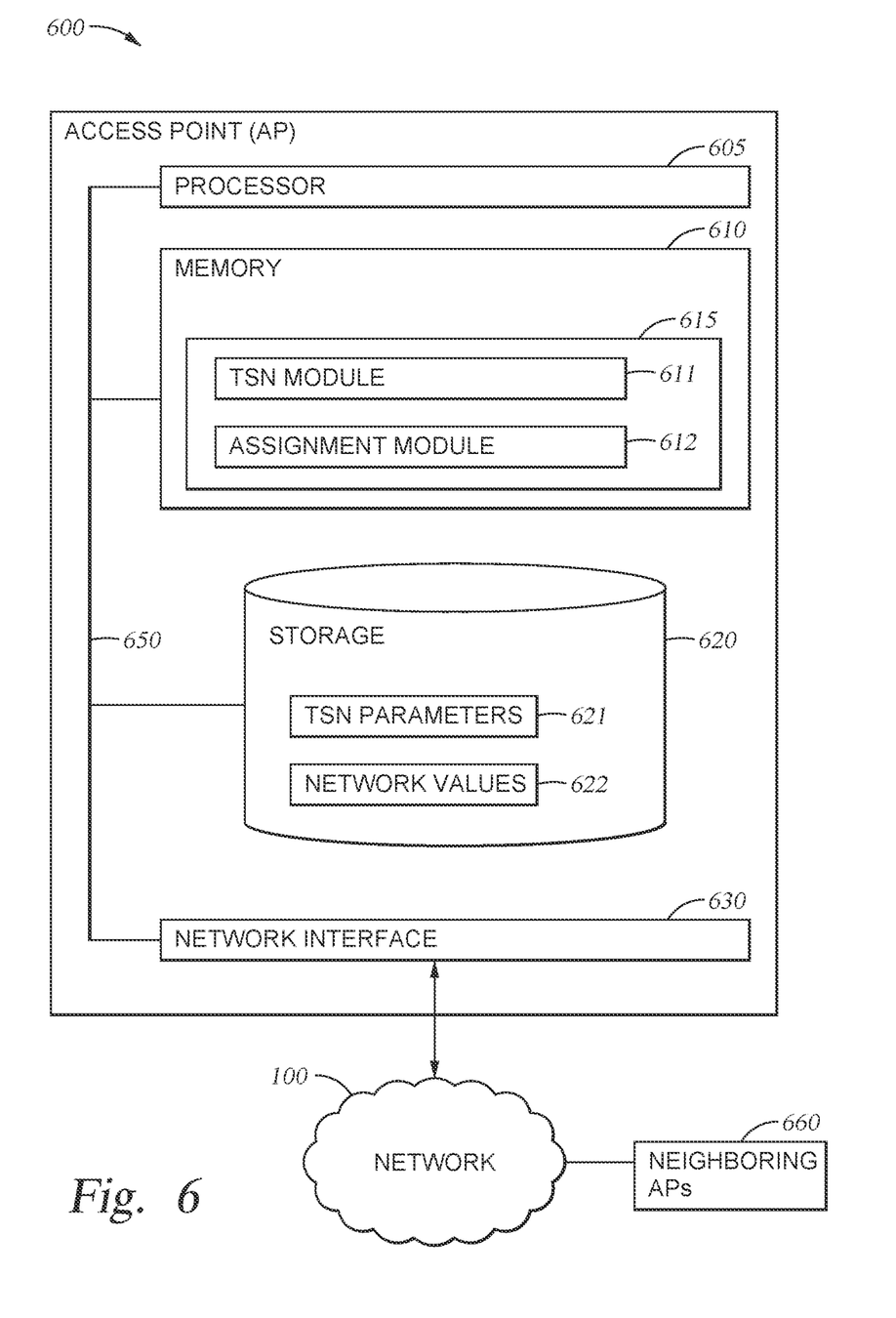
FIG. 6 is a block diagram of an access point, according to one embodiment described herein.

FIG. 6 is a block diagram of an AP 600, according to one embodiment described herein. The AP 600 is shown in the form of a general-purpose computing device, but may include a server and/or application executing on a cloud network. The AP 600 may be embodied as the AP 120 or the AP 130 or other neighboring APs as described herein. The components of the AP 600 may include, but are not limited to, one or more processing units or processors 605, a memory 610, a storage system 520, network interface 630 connecting the AP 600 to the network 100 and neighboring APs 600, and a bus 650 that couples various system components including the memory 610 and storage system 620 to processors 605 along with various input/output components (not shown). In other embodiments, the AP 600 is distributed and includes a plurality of discrete computing devices that are connected through wired or wireless networking.

Bus 650 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The AP 600 typically includes a variety of computer system readable media. Such media may be any available media that is accessible by the AP 600, and it includes both volatile and non-volatile media, removable and non-removable media.

Memory 610 can include computer system readable media in the form of volatile memory, such as random access memory (RAM) and/or cache memory. The AP 600 may further include other removable/non-removable, volatile/non-volatile computer system storage media. By way of example, storage system 620 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), digital versatile disc-read only memory (DVD-ROM) or other optical media can be provided. In such instances, each can be connected to bus 650 by one or more data media interfaces. As will be further depicted and described below, memory 610 may include at least one program product having a set (e.g., at least one) of program modules that are configured to carry out the functions of various embodiments described herein.

The AP 600 may further include other removable/non-removable, volatile/non-volatile computer system storage media. In some examples storage system 620 may be included as part of memory 610 and may typically provide a non-volatile memory for the networked computing devices, and may include one or more different storage elements such as Flash memory, a hard disk drive, a solid state drive, an optical storage device, and/or a magnetic storage device. For example, storage system 620 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 650 by one or more data media interfaces. Storage system 620 may include media for a TSN parameters and TSN assignments, and other information stored for access and use by the AP 600.

Memory 610 may include a plurality of modules 615 for performing various functions described herein. The modules 615 generally include program code that is executable by one or more of the processors 605. As shown, modules 615 include the TSN module 611 and assignment module 612. The modules 615 may also interact with each other and storage system 620 to perform certain functions as described herein.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   detecting a TSN device within an area covered by a first network device and a second network device, wherein the TSN device is physically located between the first network device and the second network device;
   determining a modulation and Coding Scheme (MCS) rate for a plurality of TSN capable devices using a same path loss model and connected to the first network device, wherein the plurality of TSN capable devices comprises the TSN device;
   causing the plurality of TSN capable devices to use the MCS rate for upload traffic to the first network device;
   determining, via communication between the first network device and the second network device, a TSN time slot for the first network device and a resource unit (RU) for the first network device to transmit TSN traffic based on a validity window indicating a time slot when the second network device will not transmit TSN traffic and a RU utilized by the second network device; and
   transmitting the TSN traffic from the first network device to the TSN device according to the TSN time slot and the RU for the first network device.

2. The method of claim 1, further comprising:
   receiving a RU intent message from the second network device, wherein the RU intent message comprises the validity window indicating the time slot when the second network device will not transmit TSN traffic and wherein the RU intent message comprises the RU utilized by the second network device;
   determining the TSN time slot for the first network device based on the validity window; and
   determining the RU for the first network device based on the RU intent message.

3. The method of claim 2 further comprising:
   receiving, at a first time, a beacon frame from the second network device comprising time synchronization information;
   determining, using the first time and the time synchronization information, a clock drift value between the first network device and the second network device; and
   wherein determining the TSN time slot for the first network device further comprises:
      determining the TSN time slot for the first network device based on the validity window and the clock drift value.

4. The method of claim 3, further comprising:
   determining a constant offset value;
   altering the TSN time slot for the first network device according to the constant offset value; and
   transmitting a broadcast frame to the TSN device comprising an instruction to not transmit during a time according to the clock drift value and the constant offset value.

5. The method of claim 1, further comprising:
   receiving an indication that the first network device is a TSN lead for the first network device and the second network device; and
   determining the TSN time slot for the first network device and the RU for the first network device by:
      allocating the TSN time slot and the RU for the first network device;
      allocating a neighbor TSN time slot for the second network device and a neighbor RU for the second network device; and
   providing the neighbor TSN time slot and the neighbor RU to the second network device.

6. The method of claim 5, further comprising:
   determining a transmit power adjustment for the RU for the first network device; and
   transmitting TSN traffic according to the TSN time slot and RU by:
      adjusting a transmit power for the RU according to the transmit power adjustment during the TSN time slot.

7. The method of claim 1, wherein a TSN neighbor message is received from a network controller and wherein an identification of a TSN neighbor is based on a neighbor discovery method at the network controller.

8. A system comprising:
   one or more computer processors; and
   a memory containing a program which when executed by the computer processors performs an operation comprising:
      detecting a TSN device within an area covered by a first network device and a second network device, wherein the TSN device is physically located between the first network device and the second network device;
      determining a modulation and Coding Scheme (MCS) rate for a plurality of TSN capable devices using a same path loss model and connected to the first network device, wherein the plurality of TSN capable devices comprises the TSN device;
      causing the plurality of TSN capable devices to use the MCS rate for upload traffic to the first network device;
      determining, via communication between the first network device and the second network device, a TSN time slot for the first network device and a resource unit (RU) for the first network device to transmit TSN traffic based on a validity window indicating a time slot when the second network device will not transmit TSN traffic and a RU utilized by the second network device; and
      transmitting the TSN traffic from the first network device to the TSN device according to the TSN time slot and the RU for the first network device.

9. The system of claim 8, wherein the operation further comprises:
   receiving a RU intent message from the second network device, wherein the RU intent message comprises the validity window indicating the time slot when the second network device will not transmit TSN traffic and wherein the RU intent message comprises the RU utilized by the second network device;
   determining the TSN time slot for the first network device based on the validity window; and
   determining the RU for the first network device based on the RU intent message.

10. The system of claim 9, wherein the operation further comprises:
   receiving, at a first time, a beacon frame from the second network device comprising time synchronization information;
   determining, using the first time and the time synchronization information, a clock drift value between the first network device and the second network device; and
   wherein determining the TSN time slot for the first network device further comprises:

determining the TSN time slot for the first network device based on the validity window and the clock drift value.

11. The system of claim 10, wherein the operation further comprises:
    determining a constant offset value;
    altering the TSN time slot for the first network device according to the constant offset value; and
    transmitting a broadcast frame to the TSN device comprising an instruction to not transmit during a time according to the clock drift value and the constant offset value.

12. The system of claim 8, wherein the operation further comprises:
    receiving an indication that the first network device is a TSN lead for the first network device and the second network device; and
    determining the TSN time slot for the first network device and the RU for the first network device by:
        allocating the TSN time slot and the RU for the first network device;
        allocating a neighbor TSN time slot for the second network device and a neighbor RU for the second network device; and
    providing the neighbor TSN time slot and the neighbor RU to the second network device.

13. The system of claim 12, wherein the operation further comprises:
    determining a transmit power adjustment for the RU for the first network device; and
    transmitting TSN traffic according to the TSN time slot and RU further by:
        adjusting a transmit power for the RU according to the transmit power adjustment during the TSN time slot.

14. The system of claim 8, wherein a TSN neighbor message is received from a network controller and wherein an identification of a TSN neighbor is based on a neighbor discovery method at the network controller.

15. A computer program product, the computer program product comprising:
    a non-transitory computer-readable storage medium having computer-readable program code embodied therewith, the computer-readable program code executable by one or more computer processors to perform an operation, the operation comprising:
        detecting a TSN device within an area covered by a first network device and a second network device, wherein the TSN device is physically located between the first network device and the second network device;
        a modulation and Coding Scheme (MCS) rate for a plurality of TSN capable devices using a same path loss model and connected to the first network device, wherein the plurality of TSN capable devices comprises the TSN device;
        causing the plurality of TSN capable devices to use the MCS rate for upload traffic to the first network device; and
        determining, via communication between the first network device and the second network device, a TSN time slot for the first network device and a resource unit (RU) for the first network device to transmit TSN traffic based on a validity window indicating a time slot when the second network device will not transmit TSN traffic and a RU utilized by the second network device; and
        transmitting the TSN traffic from the first network device to the TSN device according to the TSN time slot and the RU for the first network device.

16. The computer program product of claim 15, wherein the operation further comprises:
    receiving a RU intent message from the second network device, wherein the RU intent message comprises the validity window indicating the time slot when the second network device will not transmit TSN traffic and wherein the RU intent message comprises the RU utilized by the second network device;
    determining the TSN time slot for the first network device based on the validity window; and
    determining the RU for the first network device based on the RU intent message.

17. The computer program product of claim 16, wherein the operation further comprises:
    receiving, at a first time, a beacon frame from the second network device comprising time synchronization information;
    determining, using the first time and the time synchronization information, a clock drift value between the first network device and the second network device; and
    wherein determining the TSN time slot for the first network device further comprises:
        determining the TSN time slot for the first network device based on the validity window and the clock drift value. determining a constant offset value;
    altering the TSN time slot for the first network device according to the constant offset value; and
    transmitting a broadcast frame to the TSN device comprising an instruction to not transmit during a time according to the clock drift value and the constant offset value.

18. The computer program product of claim 15, wherein the operation further comprises:
    receiving an indication that the first network device is a TSN lead for the first network device and the second network device; and
    determining the TSN time slot for the first network device and the RU for the first network device by:
        allocating the TSN time slot and the RU for the first network device;
        allocating a neighbor TSN time slot for the second network device and a neighbor RU for the second network device; and
    providing the neighbor TSN time slot and the neighbor RU to the second network device.

19. The computer program product of claim 18, wherein the operation further comprises:
    and determining a transmit power adjustment for the RU for the first network device;
    transmitting TSN traffic according to the TSN time slot and RU further by:
    adjusting a transmit power for the RU according to the transmit power adjustment during the TSN time slot.

20. The computer program product of claim 15, wherein a TSN neighbor message is received from a network controller and wherein an identification of a TSN neighbor is based on a neighbor discovery method at the network controller.

* * * * *

UNITED STATES PATENT AND TRADEMARK OFFICE
CERTIFICATE OF CORRECTION

PATENT NO. : 11,979,862 B2
APPLICATION NO. : 17/929294
DATED : May 7, 2024
INVENTOR(S) : Akram I. Sheriff et al.

It is certified that error appears in the above-identified patent and that said Letters Patent is hereby corrected as shown below:

In the Drawings

On sheet 3 of 5, in Fig. 3, and on the title page, the illustrative print figure, reference numeral 324, Line 2, before "A" insert -- AND --.

In the Specification

In Column 10, Line 1, delete "at" and insert -- as --.

In the Claims

In Column 15, Line 52, in Claim 15, before "a modulation" insert -- determining --.

In Column 16, Line 30, in Claim 17, delete "value." and insert -- value --.

In Column 16, Line 53, in Claim 19, before "determining" delete "and".

In Column 16, Line 54, in Claim 19, after "device;" insert -- and --.

Signed and Sealed this
Third Day of September, 2024

Katherine Kelly Vidal
*Director of the United States Patent and Trademark Office*